US011832593B2

(12) United States Patent
Taylor

(10) Patent No.: US 11,832,593 B2
(45) Date of Patent: Dec. 5, 2023

(54) CROW REDUCING ROOSTER AND POULTRY COLLAR

(71) Applicant: Lauren Taylor, Grand Rapids, MI (US)

(72) Inventor: Lauren Taylor, Grand Rapids, MI (US)

(*) Notice: Subject to any disclaimer, the term of this patent is extended or adjusted under 35 U.S.C. 154(b) by 185 days.

(21) Appl. No.: 17/443,255

(22) Filed: Jul. 23, 2021

(65) Prior Publication Data

US 2021/0345586 A1 Nov. 11, 2021

Related U.S. Application Data

(63) Continuation of application No. 16/090,382, filed as application No. PCT/US2014/067634 on Nov. 26, 2014, now abandoned.

(60) Provisional application No. 61/909,079, filed on Nov. 26, 2013.

(51) Int. Cl.
*A01K 45/00* (2006.01)
*A01K 15/04* (2006.01)
*A01K 27/00* (2006.01)

(52) U.S. Cl.
CPC .............. *A01K 45/00* (2013.01); *A01K 15/04* (2013.01); *A01K 27/001* (2013.01)

(58) Field of Classification Search
CPC ...... A01K 45/00; A01K 27/001; A01K 15/04; A01K 27/002; A01K 37/00; A01K 13/006; A01K 27/00; A61D 9/00; A44C 5/0007
See application file for complete search history.

(56) References Cited

U.S. PATENT DOCUMENTS

| | | | |
|---|---|---|---|
| 5,307,764 A | 5/1994 | Moy | |
| 5,467,743 A * | 11/1995 | Doose | A01K 27/006 119/858 |
| 5,469,814 A * | 11/1995 | Moy | A01K 15/04 119/815 |
| 5,628,283 A * | 5/1997 | Huegelmeyer | A61D 9/00 119/815 |
| 5,697,328 A | 12/1997 | Hunter | |
| 5,778,828 A | 7/1998 | Klinkhart et al. | |
| 6,101,981 A * | 8/2000 | Friend | A01K 27/007 119/860 |
| 6,129,054 A * | 10/2000 | Campbell | A01K 27/00 119/856 |
| 6,422,177 B1 * | 7/2002 | Noguero | A01K 27/006 119/858 |

(Continued)

OTHER PUBLICATIONS

International Search Report and Written Opinion dated Feb. 24, 2015 from corresponding PCT Application No. PCT/US2014/067634.

*Primary Examiner* — Trinh T Nguyen
(74) *Attorney, Agent, or Firm* — HONIGMAN LLP

(57) ABSTRACT

A method for limiting the volume of a crow of a rooster includes providing a collar that includes a strip of flexible material. The collar includes a securing element disposed on the strip and configured to secure the collar at the neck of the rooster. The method includes placing the collar around the neck of the rooster such that the strip encircles the neck of the rooster. After placing the collar around the neck of the rooster, securing the collar at the neck of the rooster via the securing element at a position and at a tightness around the neck of the rooster such that expansion of the neck of the rooster for breathing is allowed and further expansion of the neck of the rooster for crowing is restricted by the collar.

12 Claims, 3 Drawing Sheets

(56) References Cited

U.S. PATENT DOCUMENTS

| | | | |
|---|---|---|---|
| 6,651,595 B1* | 11/2003 | Nelson | A01K 27/001 119/815 |
| 8,726,849 B1 | 5/2014 | Billig et al. | |
| 9,724,225 B2 | 8/2017 | Hathorn | |
| 2003/0177561 A1* | 9/2003 | Sloot | A01K 11/00 2/16 |
| 2008/0053381 A1 | 3/2008 | Regina | |
| 2014/0007819 A1* | 1/2014 | Garrou | A01K 27/001 119/858 |
| 2014/0096723 A1* | 4/2014 | Kosanke | A01K 45/00 119/853 |
| 2014/0096724 A1 | 4/2014 | Kantor | |
| 2019/0387720 A1 | 12/2019 | Taylor | |

* cited by examiner

CROW REDUCING ROOSTER AND POULTRY COLLAR

CROSS REFERENCE TO RELATED APPLICATIONS

The present application is a continuation of U.S. patent application Ser. No. 16/090,382, filed on Feb. 22, 2019, which is a 371 national stage filing of PCT Application No. PCT/US14/67634, filed Nov. 26, 2014, which claims the filing benefits of U.S. provisional application Ser. No. 61/909,079, filed on Nov. 26, 2013.

FIELD OF THE INVENTION

This invention relates to an apparatus that reduces or eliminates the crow of a rooster or other crowing bird. More particularly, this invention relates to an apparatus that prevents the neck of a rooster from expanding, which reduces the volume or eliminates the sound from a crowing rooster.

BACKGROUND OF THE INVENTION

Roosters crow throughout the day. Typically in spread out farming communities, the homes are farther apart than in a most residential non-farming communities.

In a city the size of, for example Arlington, Va., or Grand Rapids, Mich., having a rooster in your backyard or apartment patio, may likely create an obnoxious and irritating environment for neighbors of the rooster owner and the rooster owner themselves.

In some jurisdictions the sound made from a crowing rooster may constitute a disturbance of the peace, or another crime or ordinance violation that places some limits or controls over loud noises.

Multiple embodiments of the system are disclosed herein. It will be understood that other objects and purposes of the invention, and variations thereof, will be apparent upon reading the following specification and inspecting the accompanying drawings.

There exists a need to reduce or eliminate the sound from a crowing rooster without causing any ill effects on the rooster.

There also exists a need to reduce the frequency of crowing.

SUMMARY OF THE INVENTION

One aspect of the present invention is a rooster collar, comprising: a length; a width; and a means to secure the rooster collar to the rooster; whereby said length encircles a rooster's neck, and said width spans at least 50% of the length of the rooster's neck.

Another aspect of the present invention is a 1. rooster collar, comprising: a plurality of lengthwise strips; a mesh portion disposed between said strips; said strip having a loop portion on an inside of collar; said strip having a hook portion on an outside of collar; a length that is longer than a perimeter of a rooster's neck; a width; whereby said loop portion is removably secured to said hook portion to secure the rooster collar to the rooster's neck.

These and other features, aspects and advantages of the present invention will become better understood with reference to the following drawings, description and claims.

DETAILED DESCRIPTION OF THE INVENTION REFERENCE NUMERALS LIST

Figure 1:
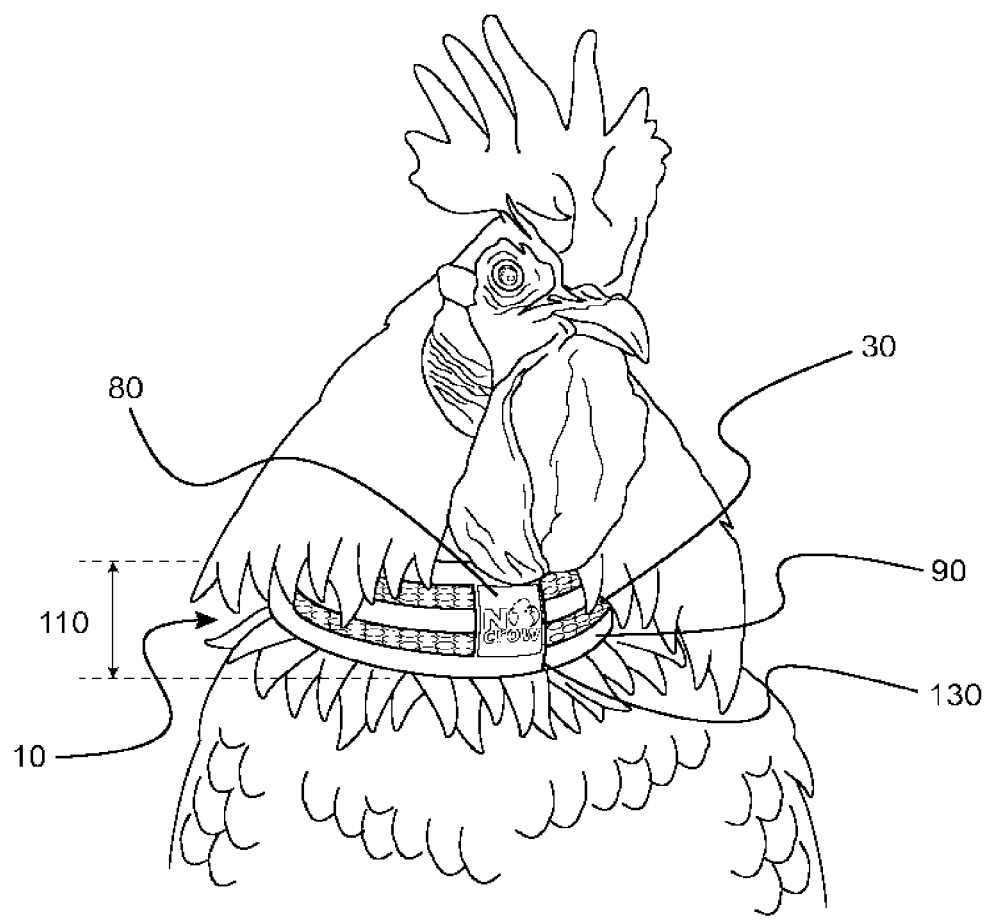
FIG. 1 is a pictorial view of one embodiment of the present invention on the neck of a rooster.

10 crow reducing rooster and poultry collar
20 hook portion
30 mesh portion
40 loop portion
50 outside of collar
60 inside of collar
70 first attachment means
80 second attachment means
90 strip
100 length
110 width
120 elastic portion
130 means to secure the collar to the rooster's neck The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

FIG. 1 illustrates an embodiment of the present invention on a rooster's neck. A second attachment means 80 is illustrated as being on the outside of collar 50. The second attachment means 80 is any means that connects the collar 10 together. In one embodiment the second attachment means 80 may have a portion of multiple hooks 20 or hook portion 20.

FIG. 1 also illustrates a plurality of strips 90 with a mesh portion 30 disposed between the strips 90. The strips 90 may have a hook portion 20 disposed thereon. The hook portion 20 on the outside of collar 50 can be removably secured to a loop portion 40 on an inside of collar 60, best illustrated in FIGS. 3 and 6.

FIG. 1 also illustrates the rooster collar 10 having a width 110 that spans at least 50% of the length of the rooster's neck.

Figure 2:
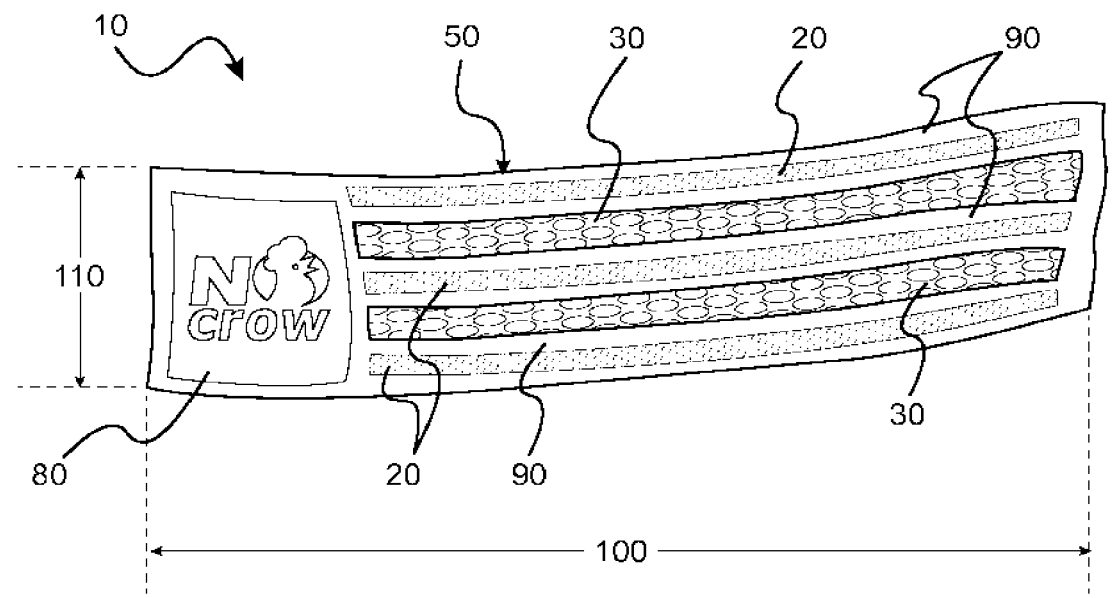
FIG. 2 is a pictorial view of an embodiment of the outside portion of the present invention.

FIG. 2 illustrates an embodiment of the outside of the collar 50. The outside collar 50 may have at least one strip having a hook portion 20. FIG. 2 illustrates 3 strips having a hook portion 20. In one embodiment the hook portion 20 may be disposed throughout the entire length of the strip 90.

Figure 4:
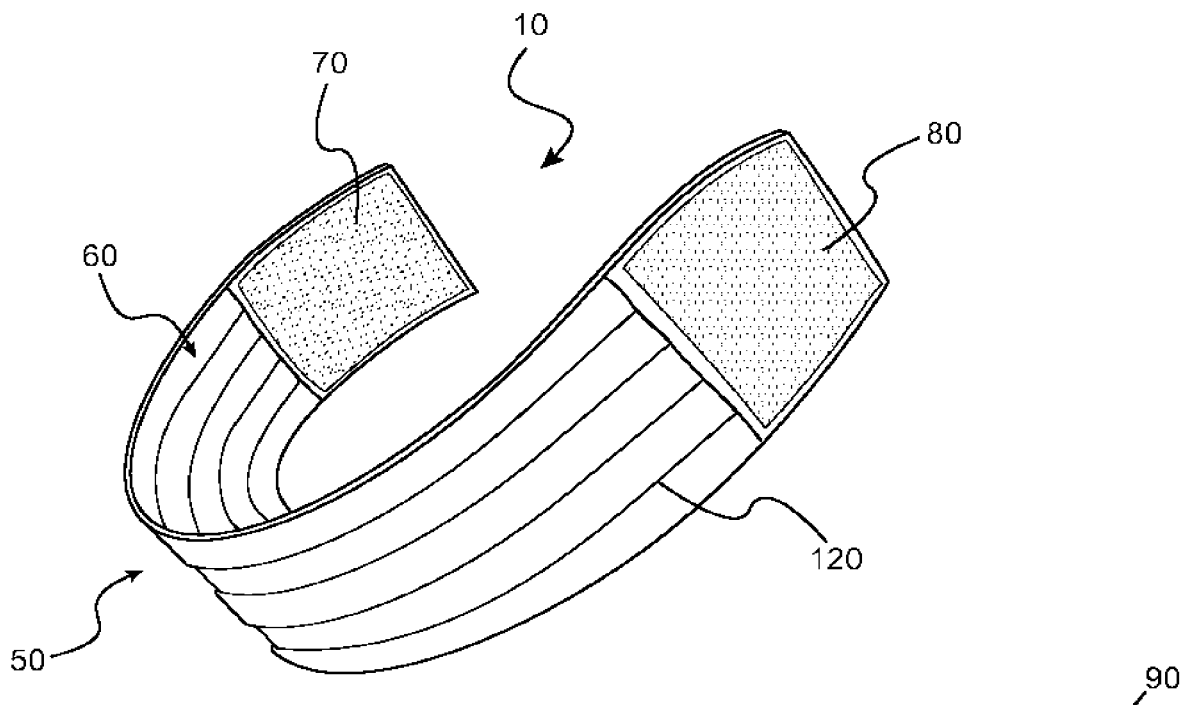
FIG. 4 is a pictorial view of an embodiment of the present invention.

Alternatively, FIG. 4 illustrates another embodiment whereby the second attachment means 80 is a portion on the outside of collar 80 near a first edge, and a first attachment means 70 is a portion on the inside of collar 60 near a second edge. An elastic portion 120 may be disposed between the first attachment means 70 and the second attachment means 80.

FIG. 2 also illustrates a mesh portion 30 may be connected between the strips 90. The mesh portion 30 allows the bird or rooster's neck to be exposed to the air and the ambient environment. The mesh portion 30 also provides structural integrity by assisting in maintaining strips 90 from moving upwardly or downwardly.

FIG. 2 also illustrates the rooster collar having a length 100 and a width 110. The length 100 may be longer than the perimeter of a rooster's neck.

There may be rooster collars having different lengths (100) and widths (110) depending on the size of the animal's or rooster's neck.

Figure 3:
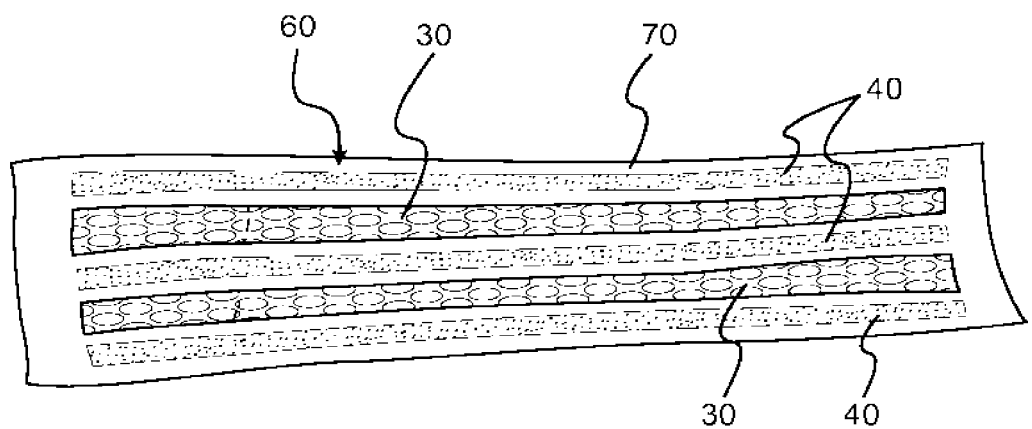
FIG. 3 is a pictorial view of an embodiment of the inside portion of the present invention.

FIG. 3 illustrates the inside of collar 60. The inside of collar 60 may have a loop portion 40 that can be removably secured to the hook portion 20. The loop portion 40 may be on a strip 90. In one embodiment the loop portion 40 may span the entire length of the strip 90.

Alternatively, in one embodiment, as illustrated in FIG. 4, a first attachment means 70 may be disposed on the inside of collar 60 near one of the edges. And the second attachment means 80 may be disposed on the outside of collar near the other edge.

FIG. 3 also illustrates that mesh portion 30 may be disposed between the strips 90.

Figure 6:
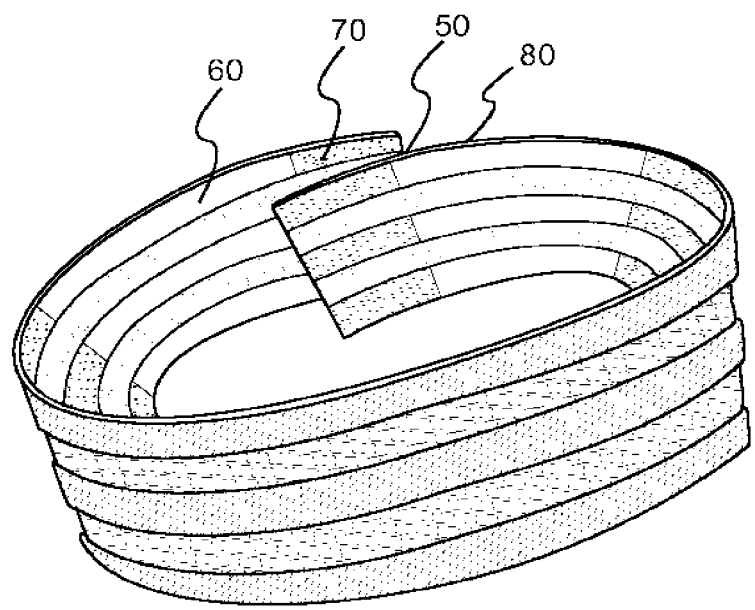
FIG. 6 is a pictorial view of an embodiment of the present invention.

As illustrated in FIG. 6, to secure the collar 10 to the rooster, the collar 10 is wrapped around the rooster's neck, and then the first attachment means 70 is secured to the second attachment means 80. In one embodiment the first attachment means 70 may be a hook portion 20. In one embodiment the second attachment means 80 may be a loop portion 40.

The collar 10 effectively limits the volume of a rooster's crow by restricting the expansion of the rooster's neck and throat, when it tries to crow, which is necessary for a full volume crow.

Or, alternatively, the first attachment means 70 may be a loop portion 40, and the second attachment means 80 may be a hook portion 20, respectively.

Figure 5:
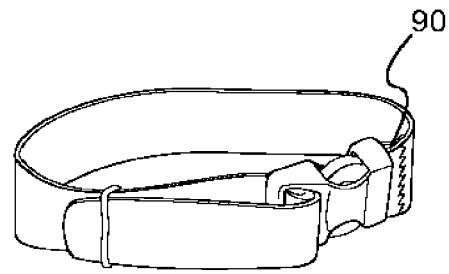
FIG. 5 is a pictorial view of an embodiment of the present invention.

As illustrated in FIG. 5, the first attachment means 70 and second attachment means 80 may be a buckle and clasp closure.

Alternatively, the first attachment means 70 and second attachment means may be a button with two mating parts, such as a snap.

In one embodiment the length of the collar may be 4 to 12 inches. There may be different sized products; such as different models of different lengths, such as 4, 8, 10, and 12 inch lengths. The width of the collar 10 may be about 2 inches.

To use the present invention 10, one may move the feathers upwardly on the neck, and then apply the collar 10. To make sure that the collar is not too tight, a finger should be able to enter the collar 10, but not be able to go entire through the width of the collar 10 from the top to the bottom width edge.

In some situations the collar 10 is placed on the rooster for about 5 to 10 minutes, until the rooster becomes accustomed to it, then it can be on for longer periods of time, until the collar can remain on the rooster for days or permanently. The collar 10 may be changed periodically for cleaning the collar 10 or the rooster.

The collar 10 may be snugly wrapped around the animal's throat, tight enough to restrict the expansion of its throat when it tries to crow, loose enough to allow unrestricted breathing, eating, and other normal activity.

FIGS. 2 and 3 illustrate the collar with 3 strips 90. However, it may have two strips 90, one thick strip 90, or any number of strips 90.

It should be understood, of course, that the foregoing relates to exemplary embodiments of the invention and that modifications may be made without departing from the spirit and scope of the invention as set forth in the following claims.

The invention claimed is:

1. A method for limiting the volume of a crow of a rooster, the method comprising:
    providing a collar comprising a strip having a first end and a second end distal from the first end, and a securing element disposed on the strip;
    wherein the securing element comprises a hook portion disposed on a first side of the strip and a loop portion disposed on a second side of the strip opposite the first side;
    placing the collar around a neck of a rooster and removably attaching the hook portion to the loop portion by overlapping the first side at the first end with the second side at the second end of the strip to secure the collar at a position and at a tightness around the neck of the rooster such that expansion of the neck of the rooster for breathing is allowed and further expansion of the neck of the rooster for crowing is restricted by the collar;
    wherein the strip comprises a plurality of strips arranged parallel to one another and spaced apart relative to one another;
    wherein the collar comprises a mesh portion disposed between and connecting adjacent strips of the plurality of strips; and
    wherein the hook portion spans the length of each strip of the plurality of strips on the first side and the loop portion spans the length of each strip of the plurality of strips on the second side, and wherein none of the hook portion or the loop portion overlaps the mesh portion.

2. The method of claim 1, wherein placing the collar around the neck of the rooster comprises moving feathers on the neck upward along the neck and placing the collar around the neck below the moved feathers.

3. The method of claim 1, wherein the hook portion is disposed on the first side at the first end and the loop portion is disposed on the second side at the second end.

4. The method of claim 1, wherein each of the plurality of strips is joined to a first tab at the first end and a second tab at the second end.

5. The method of claim 4, wherein the hook portion is disposed on the first side at the first tab and the loop portion is disposed on the second side at the second tab.

6. The method of claim 5, wherein the hook portion is disposed on the first side at the first tab and the loop portion spans the length of each strip of the plurality of strips on the second side.

7. The method of claim 1, wherein the collar comprises an elastic material.

8. The method of claim 1, wherein the plurality of strips comprises two strips.

9. The method of claim 1, wherein the plurality of strips comprises three strips.

10. The method of claim 1, wherein a width of the collar is greater than 2 inches.

11. The method of claim 1, wherein a length of the collar is greater than 4 inches.

12. The method of claim 1, wherein a length of the collar is less than 12 inches.

\* \* \* \* \*